United States Patent
Arakawa

[19]
[11] Patent Number: 5,806,467
[45] Date of Patent: *Sep. 15, 1998

[54] PET LEASH

[75] Inventor: Makoto Arakawa, Tokyo, Japan

[73] Assignee: Kabushikigaisha Heisei, Tokyo, Japan

[*] Notice: The term of this patent shall not extend beyond the expiration date of Pat. No. 5,613,467.

[21] Appl. No.: 701,994

[22] Filed: Aug. 23, 1996

[30] Foreign Application Priority Data

Aug. 23, 1995 [JP] Japan .................................. 7-237598

[51] Int. Cl.$^6$ .......................... A01K 27/00; B00R 22/10
[52] U.S. Cl. ........................................ 119/771; 119/797
[58] Field of Search ...................... 119/797, 771

[56] References Cited

U.S. PATENT DOCUMENTS

| | | | |
|---|---|---|---|
| 3,752,127 | 8/1973 | Baker | 119/797 |
| 4,763,609 | 8/1988 | Kulik | 119/797 |
| 4,896,630 | 1/1990 | Luce | 119/771 |
| 5,511,293 | 4/1996 | Hubbard, Jr. et al. | 119/797 |
| 5,613,467 | 3/1997 | Arakawa | 119/771 |

FOREIGN PATENT DOCUMENTS

| | | | |
|---|---|---|---|
| 7-28855 | 7/1995 | Japan . | |
| 7-36639 | 7/1995 | Japan . | |
| 88/00540 | 1/1988 | WIPO | 119/771 |

*Primary Examiner*—Edgar S. Burr
*Assistant Examiner*—Amanda B. Sandusky
*Attorney, Agent, or Firm*—Oblon, Spivak, McClelland, Maier & Neustadt, P.C.

[57] ABSTRACT

A pet leash which can be used in various applications such as for walking of a dog in a conventional manner, for walking a large pet such as a large dog by being supported on the user's shoulder, and for an anchoring of a pet within a vehicle. The pet leash is adapted to be connected to a neck collar portion or a body strap of a pet and includes a central traction portion, a loop-shaped first holding portion formed on a proximal end of the traction portion, and a loop-shaped second holding portion formed on one of a distal end and a middle region of the traction portion.

9 Claims, 4 Drawing Sheets

PET LEASH

FIELD OF THE INVENTION

The present invention relates to a pet leash used for pets such as a dog or monkey.

DISCUSSION OF THE BACKGROUND

In general, a conventional pet leash has a hand-held a portion or holding portion formed as a thick end or a loop, and a hook secured on the distal end of the leash so as to connect to a neck strap or a body strap.

Thus, although the conventional pet leash is sufficient for usual walking of a pet such as a dog, it is difficult to make a large loop of the leash for holding it on the user's shoulder, to keep a pet near its owner by holding the pet near its neck, and also to leash a pet within a vehicle.

SUMMARY OF THE INVENTION

It is therefore a first object of the present invention to provide a pet leash which can be used in various applications such as for usual walking of a dog in a conventional manner, for walking a large pet such as a large dog by holding the leash on the user's shoulder, and for an anchoring of a pet within a vehicle.

It is a second object of the present invention to provide a pet leash which can easily keep the pet near its owner.

It is a third object of the present invention to provide a pet leash having a simple structure.

According to the present invention, there is provided a pet leash adapted to be connected to a neck or body strap of a pet comprising a central traction portion, a loop-shaped first holding portion formed on the proximal end of the traction portion, and a loop-shaped second holding portion formed on the distal end or middle region of the traction portion.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
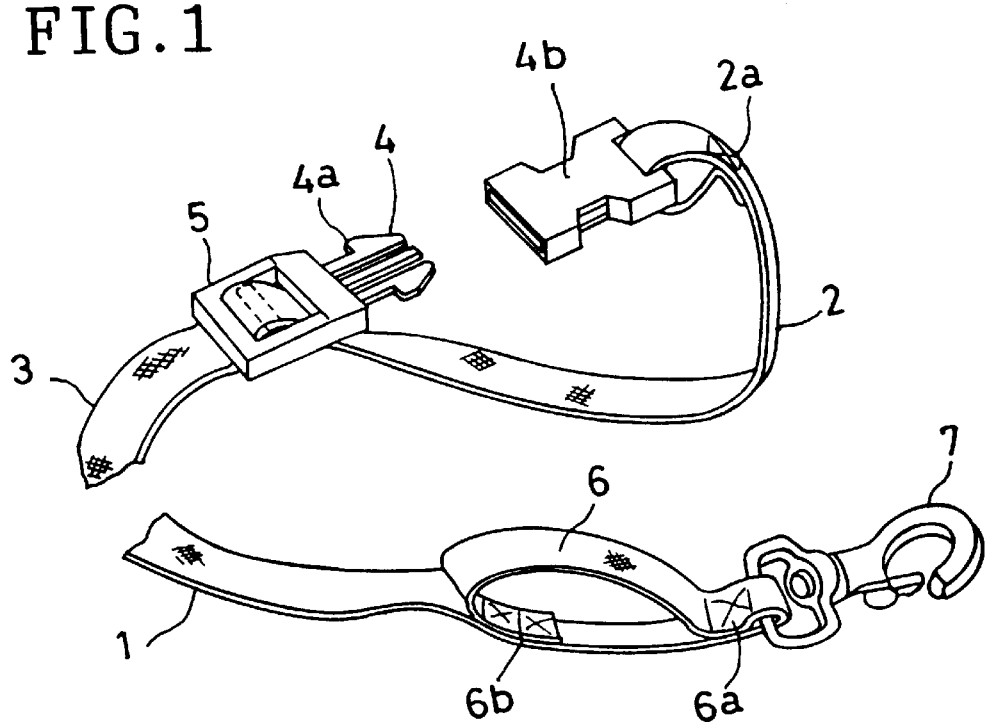
FIG. 1 is a perspective view showing a first embodiment of the present invention.

A first embodiment of the present invention will be hereinafter described with reference to FIG. 1.

Numeral 1 denotes a belt-shaped portion which is preferably formed of long braid of Nylon yarn.

Numeral 4 denotes a connector comprising an engaging projection 4a having side engaging members and a receptacle 4b having side holes therein for detachably receiving the side engaging members of the engaging projection 4a when the projection 4a is inserted into the receptacle 4b. A slidable adjuster 5 is integrally formed with the root of the engaging projection 4a. As in a conventional manner, a lateral rod is mounted on the center of the frame of the adjuster 5 and the belt-shaped member 1 is passed through an opening formed between one side of the adjuster frame and the lateral rod from the underside of the frame toward above the lateral rod and then passed through the other opening formed between the other opposite side of the adjuster frame and the lateral rod toward the underside of the frame. Accordingly, it is possible to adjust the length of the belt-shaped member 1 forming a first holding portion 2 which will be hereinafter referred to as being accomplished by sliding the adjuster 5 along the member 1.

The proximal end of the belt-shaped member 1 is passed through an opening formed on the root of the receptacle 4b and firmly secured on the belt-shaped member 1 at a portion 2a thereof by stitching and/or heat welding. When the engaging projection 4a is inserted into the receptacle 4b, the belt-shaped member 1 extending between the adjuster 5 and the receptacle 4b forms a loop-shaped first holding portion 2.

A portion of the belt-shaped member 1 extending distally from the adjuster 5 is formed as a central traction portion 3. The distal end of the belt-shaped member 1 forming the traction portion 3 is then passed through an opening formed on a hook 7 adapted to be connected to a neck strap or a body strap (not shown) for a pet and then turned up to form a loop 14 connected to one of a loop-shaped second holding portion 6 and the central traction portion 3. The overlapped belt-shaped members 1 forming the second holding portion 6 are firmly secured to each other at portions 6a and 6b as shown in FIG. 1 also by stitching and/or heat welding.

Figure 2:
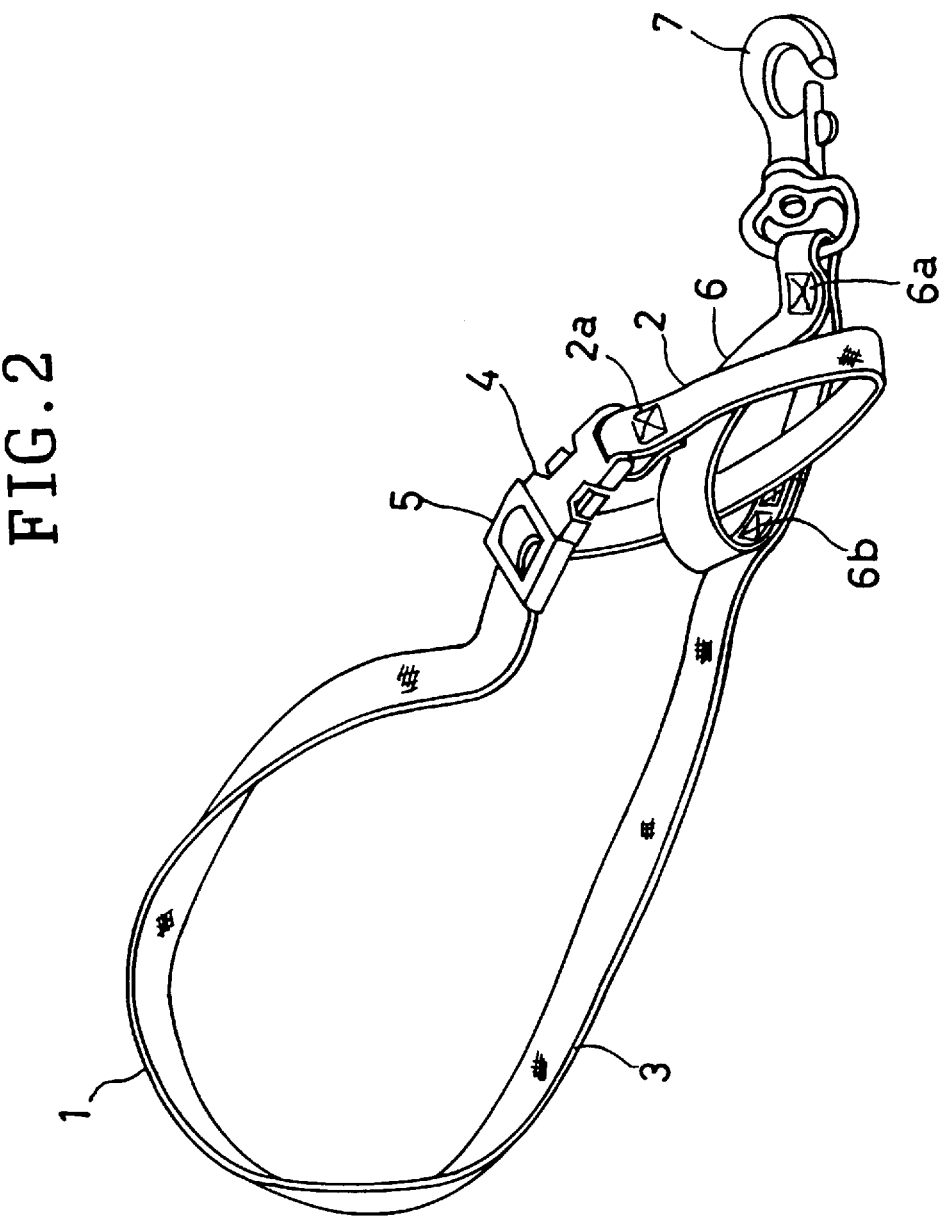
FIG. 2 is a perspective view showing one example in use of the first embodiment of the present invention.

A method for using the pet leash of the above mentioned embodiment will now be described with reference to FIG. 2. FIG. 2 shows an example of the pet leash of the present invention in use so as to form a large loop enabling the traction portion 3 to be secured or held on the user's shoulder by passing the receptacle 4b of the first holding portion 2 through the loop of the second holding portion 2 and then engaging with the projection 4b. The traction portion 3 thus forms a large loop which can be held on the user's shoulder. The loop length formed by the traction portion 3 can be adjusted by sliding the adjuster 5.

In this manner of use, it is possible to support the pulling force of a pet (e.g. a dog) by the entire body of its owner and thus to safely control even a large dog .

It is also possible to keep the pet near its owner by grasping the second holding portion 6.

In addition, although the stitched and/or heat welded portion 6a near the hook 7 may be peeled off, the hook 7 will be still kept within the loop of the second holding portion 6 and thus release of the pet from the leash is prevented.

Figure 6:
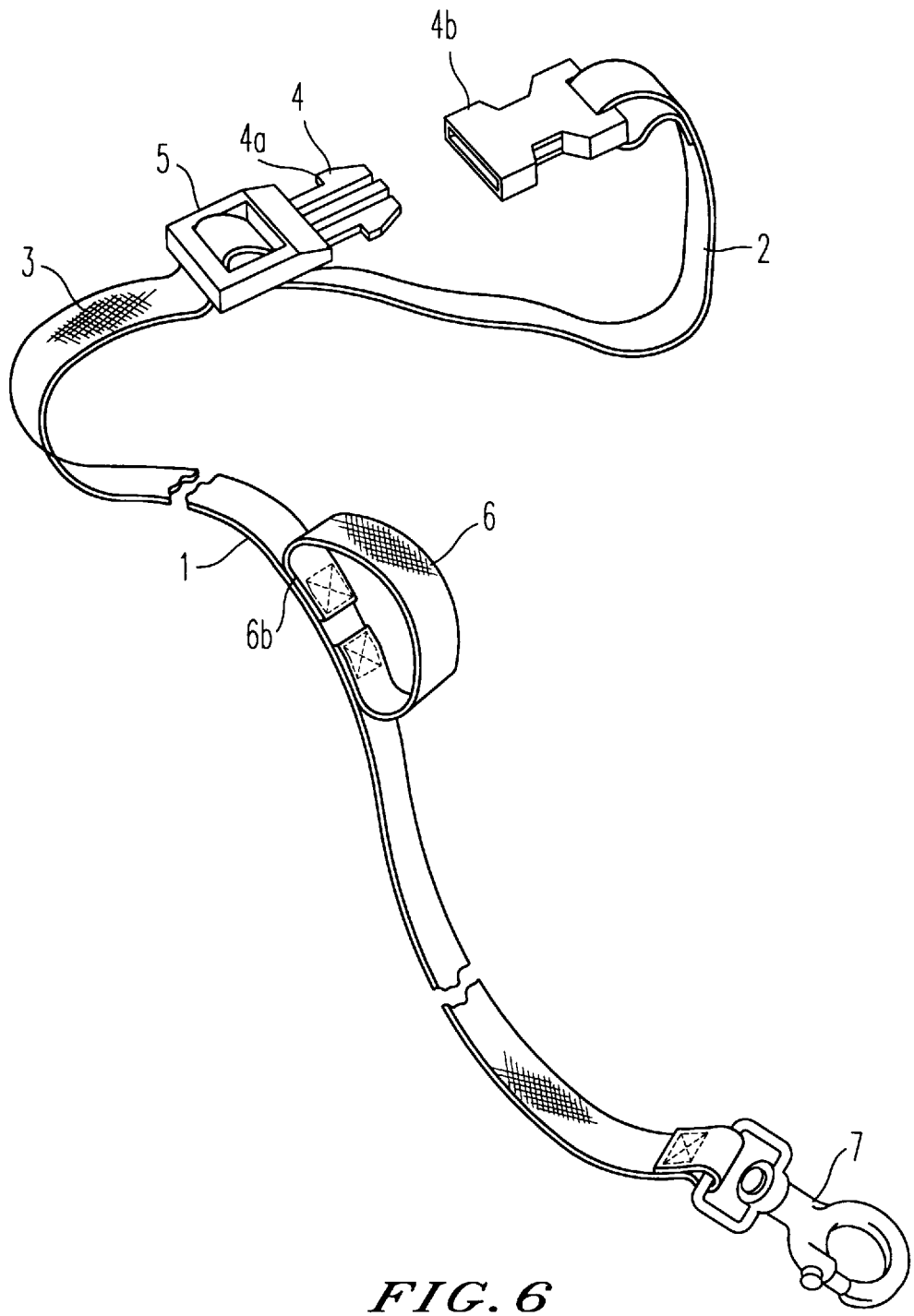
FIG. 6 is a view similar to FIG. 1 but showing the second holding portion at a middle region of the traction portion.

In a modification shown in FIG. 6 in which the stitched and/or heat weld portion is extended to a long region from the distal end of the traction portion so that the second holding portion 6 will be formed substantially at the middle of the traction portion 3, the long stitched portion will be sufficiently resistant to chewing by the pet and thus exhibit an excellent durability.

In the manner in use shown in FIG. 2, if the large loop portion formed by the traction portion 3 is secured around, for example, a standing tree, it is possible to keep the pet near the tree.

A method for anchoring the pet within a vehicle using the pet leash of the first embodiment via a seat belt will now be described with reference to FIG. 3.

Figure 3:
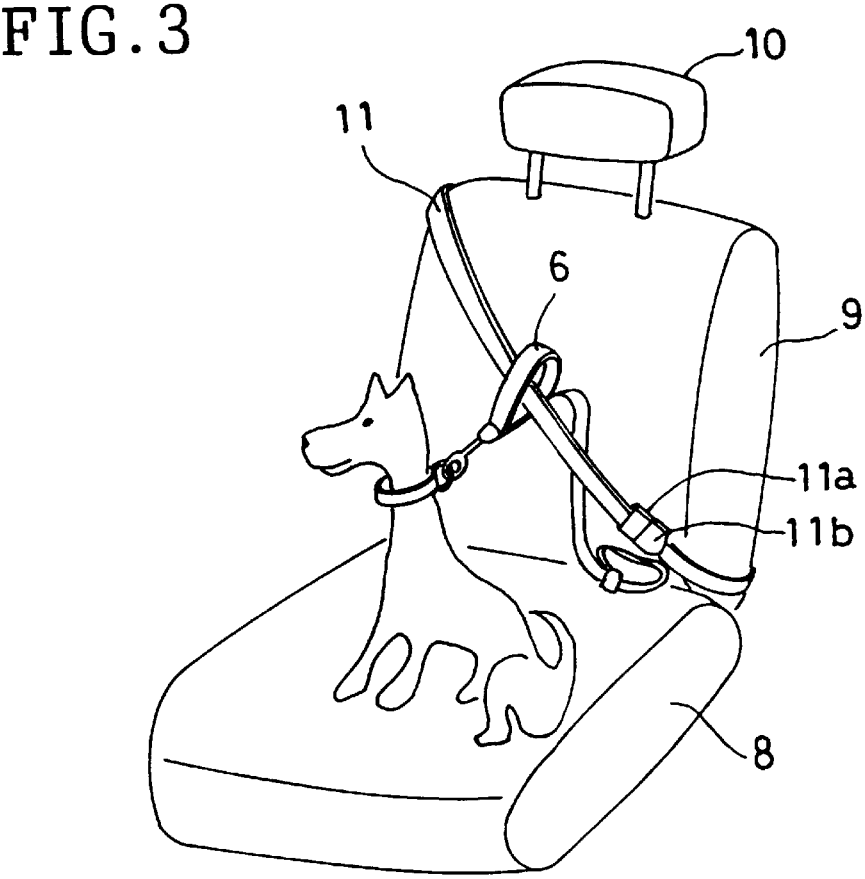
FIG. 3 is a perspective view showing a condition in use of the first embodiment of the present invention in which a dog is held within a vehicle via a seat belt.

In FIG. 3, reference numeral 8 denotes a seat of a vehicle. Similarly, 9 denotes a backrest, 10 denotes a headrest, and 11 denotes at seat belt.

As shown in FIG. 3, an engaging projection 11a of the seat belt 11 is passed through the second holding portion 6 of the pet leash and then inserted into a receptacle 11b of the seat belt 11.

Since the pet is kept near the seat belt 11 in this manner, the driver is not disturbed while driving by the pet and running away of the pet from the vehicle is also prevented when the door of vehicle is opened. Thus, the pet can be safely anchored within any vehicle having the seat belt.

Figure 4:
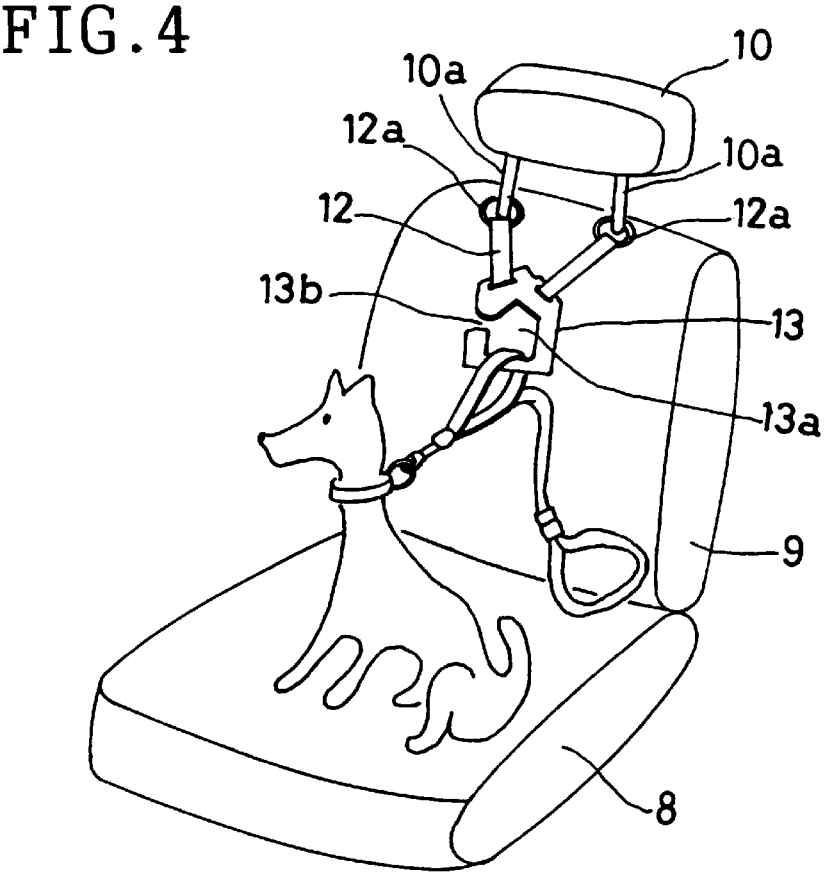
FIG. 4 is a perspective view showing a condition in use of the first embodiment of the present invention in which a dog is anchored within a vehicle via an anchoring device.

Another method for anchoring the pet within the cabin of vehicle using the pet leash of the first embodiment via an anchoring device will then be described with reference to FIG. 4.

Each of two supporting members 10a of the headrest 10 is passed through each anchoring ring 12a of an anchoring belt 12 and then inserted into bores formed on the top of the backrest 9. The other ends of the anchoring belt 12 are connected to an anchoring plate 13 made of metal or plastic and formed with an anchoring recess 13a and a slit 13b.

The pet can be easily anchored within the vehicle by inserting the second holding portion 6 through the slit 13b into the anchoring recess 13a. The pet can be easily removed from the vehicle by removing the second holding portion 6 from the anchoring plate 13 through the slit 13b.

Figure 5:
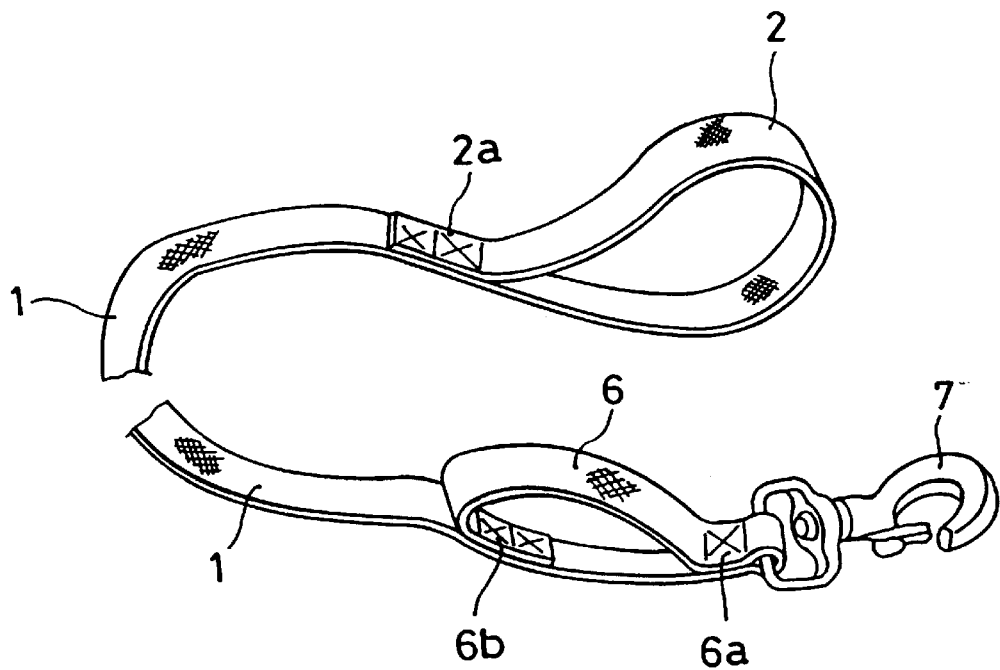
FIG. 5 is a perspective view showing a second embodiment of the present invention.

Finally, a second embodiment of the present invention will be described with reference to FIG. 5.

In this embodiment, the first holding portion 2 has a simple structure formed only by the belt-shaped member 1 without using the connector 4 and the slidable adjuster 5 used in the first embodiment in FIG. 1.

The second embodiment is advantageous in reducing manufacturing cost as compared with the first embodiment. Although it is impossible to use the pet leash of the second embodiment in the manner shown in FIG. 2, other functions thereof are substantially the same as that of the first embodiment.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pet leash connectable to a neck or body strap for a pet and connectable to an automobile seat belt having a holding portion and an engaging portion insertable into the holding portion, which comprises:

a central traction portion, a loop-shaped first holding portion formed on a proximal end of the traction portion, a loop-shaped second holding portion formed on one of a distal end and a middle region of the traction portion wherein said loop-shaped second holding portion is fixedly secured to said central traction portion and is so dimensioned as to permit the engaging portion and holding portion of the automobile seat belt to be removable through said loop-shaped second holding portion; and a hook connected to a loop located at one of an end portion of the traction portion and an end portion of the second holding portion.

2. A pet leash according to claim 1 wherein said loop-shape of the second holding portion comprises a turned up distal end portion of the traction portion of the leash.

3. A pet leash according to claim 1 which comprises a disconnectable connector interposed in the first holding portion.

4. A pet leash according to claim 3 wherein said connector comprises an engaging projection and said first holding portion includes a receptacle detachably receiving the engaging projection.

5. A pet leash according to claim 4 which comprises a slidable adjuster wherein said first holding portion has a loop length which is adjustable by said slidable adjuster.

6. A pet leash according to claim 5 wherein said slidable adjuster is integrally formed with a root portion of one of the engaging projection and the receptacle.

7. A pet leash according to claim 4, wherein one of said engaging projection and said receptacle is dimensioned so as to be movable through the loop-shaped second holding portion.

8. A pet leash according to claim 1 wherein a seat belt of a vehicle is insertable through the second holding portion.

9. A pet leash anchoring assembly in combination with a pet leash connectable to an automobile seat belt having a holding portion and an engaging portion insertable into the holding portion, which comprises:

an automobile headrest having support members, said pet leash including;

a central traction portion;

a loop-shaped first holding portion formed on a proximal end of the traction portion;

a loop-shaped second holding portion formed on one of a distal end and a middle region of the traction portion wherein said loop-shaped second holding portion is fixedly secured to said central traction portion and is so dimensioned as to permit the engaging portion and holding portion of the automobile seat belt to be removable through said loop-shaped second holding portion; and an anchoring plate having an engaging recess which interconnects the support members of the headrest with the loop shaped second holding portion wherein said loop-shaped second holding portion is anchorable into said engaging recess of said anchoring plate.

* * * * *

REEXAMINATION CERTIFICATE (4114th)

United States Patent [19]
Arakawa

[11] B1 5,806,467
[45] Certificate Issued *Jul. 11, 2000

[54] PET LEASH

[75] Inventor: Makoto Arakawa, Tokyo, Japan

[73] Assignee: Kabushikigaisha Heisei, Tokyo, Japan

Reexamination Request:
No. 90/005,361, May 17, 1999

Reexamination Certificate for:
Patent No.: 5,806,467
Issued: Sep. 15, 1998
Appl. No.: 08/701,994
Filed: Aug. 23, 1996

[*] Notice: This patent is subject to a terminal disclaimer.

[30] Foreign Application Priority Data

Aug. 23, 1995 [JP] Japan ..................... 7-237598

[51] Int. Cl.⁷ ................. A01K 27/00; B00R 22/10
[52] U.S. Cl. ........................... 119/771; 119/797
[58] Field of Search ............................ 119/771, 797

[56] References Cited

U.S. PATENT DOCUMENTS 2,909,154 10/1959 Thomas .
3,332,398 7/1967 Mintz .
5,038,719 8/1991 McDonough .
5,351,654 10/1994 Fuentes ........................... 119/770
5,363,810 11/1994 Kraus ............................. 119/795

FOREIGN PATENT DOCUMENTS 1331941 9/1994 Canada .

*Primary Examiner*—Michael J. Carone

[57] ABSTRACT

A pet leash which can be used in various applications such as for walking of a dog in a conventional manner, for walking a large pet such as a large dog by being supported on the user's shoulder, and for an anchoring of a pet within a vehicle. The pet leash is adapted to be connected to a neck collar portion or a body strap of a pet and includes a central traction portion, a loop-shaped first holding portion formed on a proximal end of the traction portion, and a loop-shaped second holding portion formed on one of a distal end and a middle region of the traction portion.

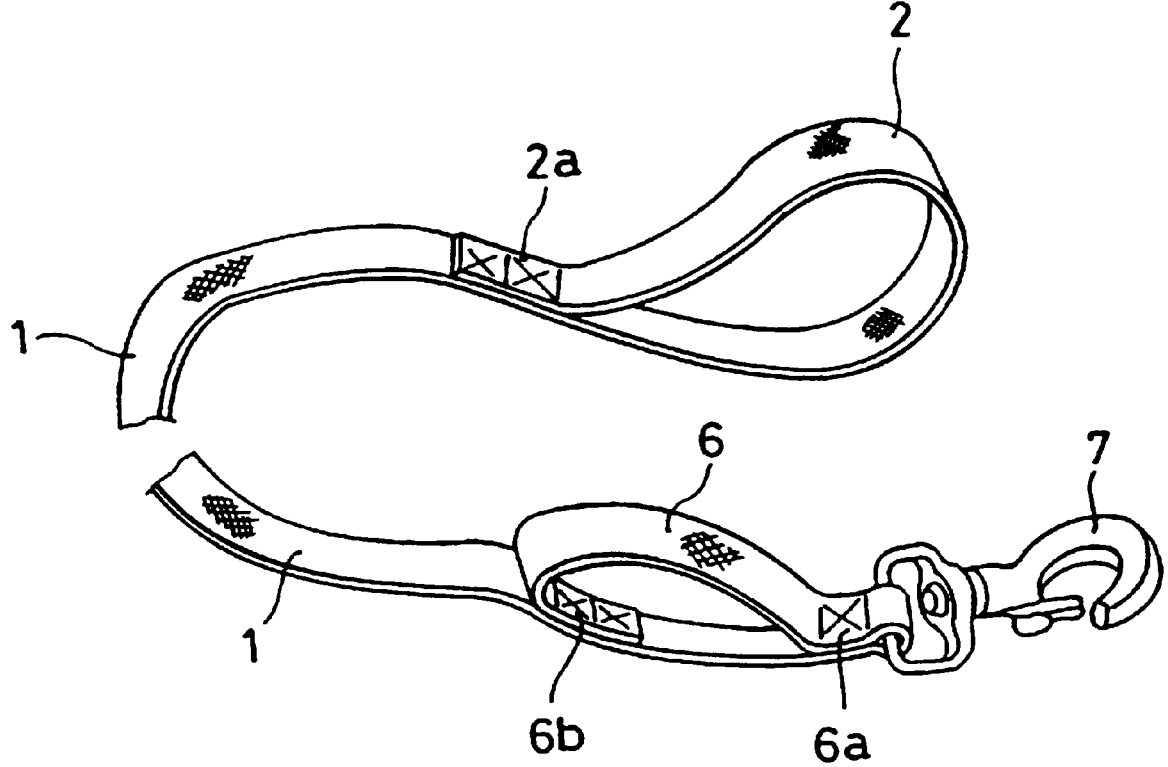

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3–7 and 9 are confirmed.

Claims 1, 2 and 8 are cancelled.

* * * * *